May 24, 1932. A. F. JACKSON 1,860,249
ROPE AND TWINE REEL
Filed Dec. 6, 1929
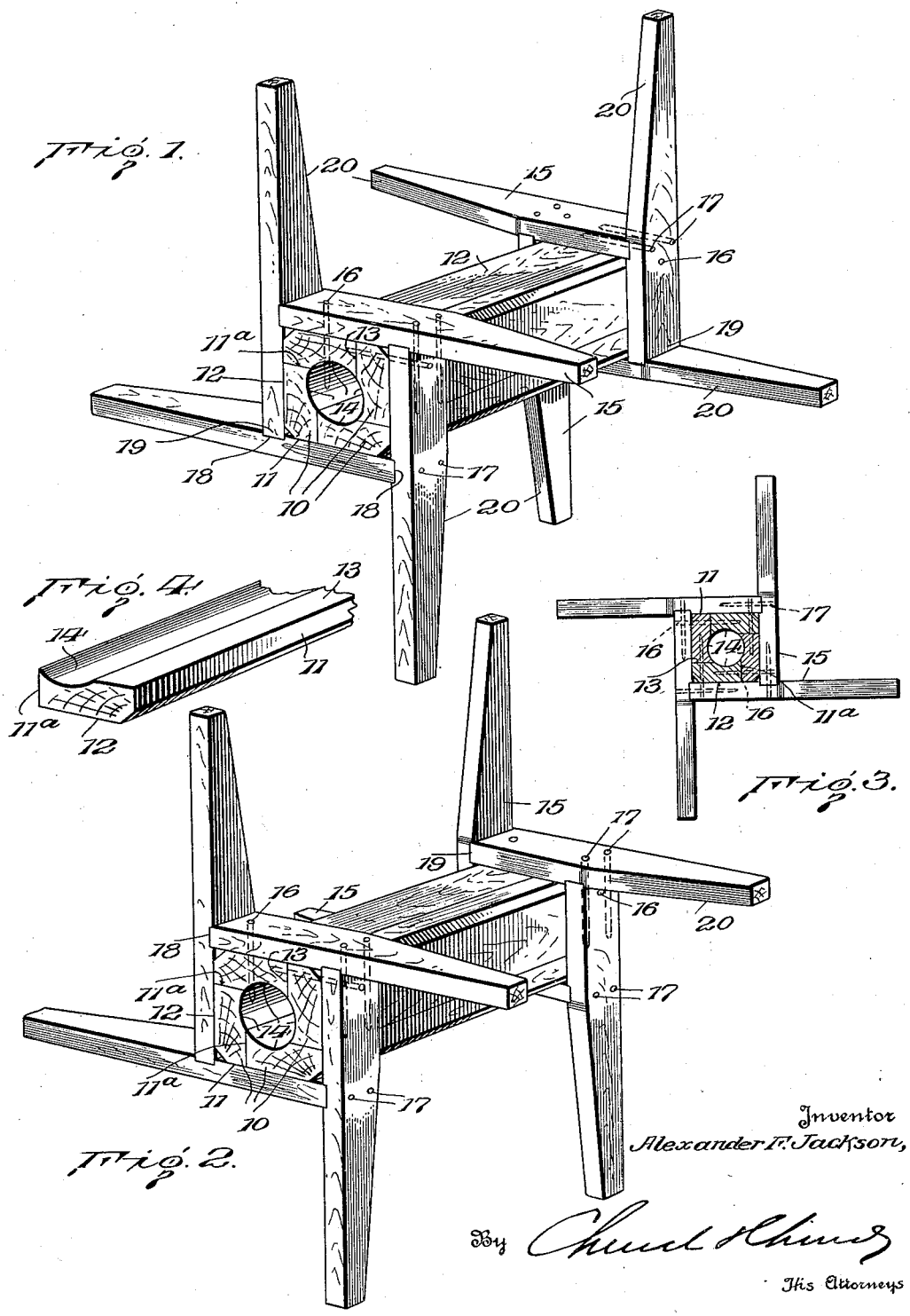

Patented May 24, 1932

1,860,249

UNITED STATES PATENT OFFICE

ALEXANDER F. JACKSON, OF MOUNT VERNON, NEW YORK, ASSIGNOR TO COLUMBIAN ROPE COMPANY, OF AUBURN, NEW YORK, A CORPORATION OF NEW YORK

ROPE AND TWINE REEL

Application filed December 6, 1929. Serial No. 412,201.

This invention relates to improvements in reels, especially designed for having wound thereon ropes, twines, and the like.

In accordance with the present practice in cordage mills, rope or twine reels are now made with end pieces composed of two comparatively thin lengths of wood mortised and drilled for the passage therethrough of the reel bar. These two mortised pieces are laid across one another with the bar openings in registry, suitable means, such as nails or the like, being used for securing them together. The projecting end portions of said strips constitute radially disposed arms for the reel. These end pieces are held in reel form by bar pieces that are notched at each end to fit the angle formed between the arms or projecting portions of the pieces of wood constituting the end pieces, the bars being held in place by being nailed to the end pieces. Such construction has certain disadvantages. For instance, the numerous nails utilized for securing the members of the end pieces together and for securing the bar pieces to said ends, greatly weaken the construction at the very point where the greatest strength is desired. Again, it is necessary that the cross pieces be reinforced at a point intermediate the end pieces. This is done by placing a "stiffening" piece in the space between the several cross pieces. The use of such a stiffening piece, however, increases the difficulty, in that it must have an opening therein for the reel bar, and, as a result, when the reel is placed on the reel bar, the operator is constantly inconvenienced by the difficulty of inserting the reel bar through the openings in three separate pieces. i. e., each of the two end pieces and the central stiffening piece.

In view of the foregoing, the present invention seeks to provide a rope or twine reel that will be of substantial and sturdy construction at the core portion thereof.

A further object is to provide a reel of this nature having a core with which no stiffening piece need be used.

A still further object is the production of a rope or twine reel having a sectional core, each section being a duplicate of all the others, with radially disposed arms at each end of the core and all of said arms being duplicates of one another. This duplication of parts naturally decreases the labor required in the manufacture thereof, and, at the same time, greatly facilitates assembly of the reels.

With these and other objects in view, the invention consists in certain details of construction and combinations and arrangements of parts, all as will be hereinafter more fully described and the novel features thereof particularly pointed out in the appended claims.

In the accompanying drawings:

Figure 1 is a perspective view of a reel made in accordance with the present invention;

Figure 2 is a perspective view of a modified form of reel.

Figure 3 is an end view thereof; and

Figure 4 is a perspective view of one of the core sections.

In accordance with the present invention, the core is made up of a plurality of sections, said core having a central bore extending longitudinally thereof throughout its length. Usually, the reel is provided with four radially disposed arms at each end, these arms retaining on the core the rope or twine as it is wound thereon. As before mentioned, the core is made up of duplicate sections, one of which is shown in Figure 4. Each of these sections 10 has substantially flat edges 11, 11a, and one substantially flat side 12. The opposite side, however, of each section has a substantially flat portion 13 and a curved portion 14. Where the reel is provided with four arms, the core is composed of four sections, and under these circumstances, the curved surface 14 of each surface will be substantially the equivalent of a quarter circle. In assembling the reel, these sections are placed together, as shown in Figure 3, with the edge 11a of each section abutting against the flat surface 13 of a second section, and with the curved surfaces 14 of the several sections constituting the wall of the central bore extending through the core.

The arms 15 are then attached to the core, each arm lying against the substantially flat surfaces 11, 12 of two juxtaposed core sections. Preferably, these surfaces 11, 12 are substantially plane throughout the length of the core sections, but it will be appreciated, need be flat only at the end portions of the core sections where the arm portions are attached. To retain the parts in position, fastening elements, such as nails 16, may be driven transversely through each arm near the base thereof, the nail being sufficiently long so as to pass through one section 10 into or beyond the surface 11a of the next adjacent section 10 of the core. In addition, nails 17 are also driven through each arm into the abutting end of a second arm.

To further strengthen the reel structure and lend rigidity especially to the arms thereof, each arm 15 is cut away or recessed as at 18, and the end portion 19 of a second arm is adapted to be seated in each of these recesses. With this construction, it will be seen that all of the core sections are duplicates of one another in shape and cross section, and, likewise, all of the arms 15 correspond to one another in shape and cross section. The several core sections abut against one another and constitute a strong, solid core, as distinguished from the core of previous reels, where a stiffening piece was necessary at a point intermediate the ends of the core. Again, the present reel may be placed on the reel bar with the greatest of ease, as there is but a single central bore extending throughout the length of the core, as distinguished from the old type of reel where the reel bar had to be lined up, so to speak, with the opening in each end piece, as well as the opening in the so-called central stiffening piece. The mounting of the arms of the present reel also gives a very rigid construction, in that each arm has a comparatively broad bearing surface on the core, and each arm has an end thereof seated in a second arm to give further rigidity thereto.

It will be noted that in the reel illustrated in Figs. 1, 3 and 4, wherein the arms are all duplicates, the arms at one end are offset radially with the arms at the opposite end. This does not detract from the security with which twine will be held on the reel and, as pointed out, it eliminates the necessity of using arms of different shape at opposite ends as is true of the reel shown in Fig. 2. In the reel shown in this figure, the arms may be termed right hand and left hand, as they must be the reversal of each other in order to have the tapered surfaces 20 of the arms on what may be termed the inner sides thereof. The tapering of the arms increases the capacity of the reel while the flat outside surfaces of said arms permit the reels to be stacked one on top of the other, end to end.

In both types of reel, the end pieces or arms might be said to be shaped as a beam supported at one end, and with the arms attached to the core in this fashion, the strongest "cross-section modulus" of each arm is disposed in a direction opposed to the strain of rope, twine, etc., wound on the reel. This is not true of the old practices, where smaller cross-section modulus of the arms were similarly disposed so that the interlacing of the arms with the twine was always necessary to reinforce the arms or prevent overtaxing their strength.

What is claimed is:

1. In a reel for rope, twine and the like, a core having a plurality of flat side surfaces at each end of its periphering and a central bore extending longitudinally thereof and a plurality of arms at each end, one arm being rigidly attached to each of said flat side surfaces on the periphery of said core.

2. In a reel for rope, twine and the like, a core having a plurality of flat side surfaces at each end of its periphery and a central bore extending longitudinally thereof and a plurality of arms at each end, one arm being rigidly attached to each of said flat side surfaces on the periphery of said core, and each of said arms having an end projecting into a recess in a second arm.

3. In a reel for rope, twine and the like, a core having a central longitudinally extending bore therein, said core being formed of a plurality of duplicate sections, each section having on one side thereof a flat surface and a curved surface, with the flat surface abutting against an edge of a second core section and said curved surface constituting a portion of the wall of said central bore, radially disposed arms attached to the periphery of said core and attaching elements each penetrating one arm and two core sections.

4. In a reel for rope, twine and the like, a core having a central longitudinally extending bore therein, said core being formed of a plurality of duplicate sections, each section having on one side thereof a flat surface and a curved surface, with the flat surface abutting against an edge of a second core section, and said curved surface constituting a portion of the wall of said central bore, and the opposite side of each section having a flat service thereon, radially disposed arms attached to the flat surfaces of said opposite sides of the core sections and attaching elements each penetrating one arm and two core sections.

5. In a reel for rope, twine and the like, a core having a central longitudinally extending bore therein, said core being formed of a plurality of duplicate sections, each section having on one side thereof a flat surface and a curved surface, with the flat surface abutting against an edge of a second core section, and said curved surface constituting a portion of the wall of said central bore, and the opposite side of each section having a flat surface thereon, radially disposed arms attached to the flat surfaces of said opposite sides of the core sections, each arm having a recess therein in which one end of a second arm is secured and attaching elements each penetrating one arm and two core sections.

6. In a reel for rope, twine and the like, a core having a plurality of flat side surfaces at each end of its periphery and a central bore extending therethrough, and a plurality of arms attached to said surfaces, the arms at one end of the core projecting therefrom in a direction opposite to the direction in which the arms at the other end project.

ALEXANDER F. JACKSON.